(12) United States Patent
Li et al.

(10) Patent No.: US 9,684,267 B2
(45) Date of Patent: Jun. 20, 2017

(54) ROLLER COATING

(75) Inventors: Guang Jin Li, San Diego, CA (US); Daniel Tanchangco, San Marcos, CA (US)

(73) Assignee: Hewlett-Packard Indigo B.V., Maastricht (NL)

( * ) Notice: Subject to any disclaimer, the term of this patent is extended or adjusted under 35 U.S.C. 154(b) by 159 days.

(21) Appl. No.: 14/343,018

(22) PCT Filed: Aug. 24, 2011

(86) PCT No.: PCT/US2011/048912
§ 371 (c)(1),
(2), (4) Date: May 7, 2014

(87) PCT Pub. No.: WO2013/028183
PCT Pub. Date: Feb. 28, 2013

(65) Prior Publication Data
US 2014/0295089 A1    Oct. 2, 2014

(51) Int. Cl.
| | | |
|---|---|---|
| B05D 3/02 | (2006.01) |
| G03G 15/08 | (2006.01) |
| B05C 1/08 | (2006.01) |
| G03G 15/10 | (2006.01) |
| C08G 18/61 | (2006.01) |
| C08G 18/76 | (2006.01) |
| C09D 175/02 | (2006.01) |
| C09D 175/04 | (2006.01) |
| C08G 18/32 | (2006.01) |

(52) U.S. Cl.
CPC ......... *G03G 15/10* (2013.01); *C08G 18/3225* (2013.01); *C08G 18/61* (2013.01); *C08G 18/7664* (2013.01); *C08G 18/7671* (2013.01); *C09D 175/02* (2013.01); *C09D 175/04* (2013.01)

(58) Field of Classification Search
CPC ..... C09D 175/02; C09D 175/04; C08L 83/04; C08G 18/3225; C08G 18/61; C08G 18/7664; C08G 18/7671; G03G 15/10
USPC ........ 399/286; 492/18; 427/385.5, 387, 487; 528/44
See application file for complete search history.

(56) References Cited

U.S. PATENT DOCUMENTS

| | | | |
|---|---|---|---|
| 6,270,449 B1 | 8/2001 | Hirayama | |
| 6,360,069 B1 * | 3/2002 | Mimura et al. | ............... 399/286 |
| 6,451,438 B1 | 9/2002 | Chiang et al. | |
| 7,007,384 B2 | 3/2006 | Hirayama | |
| 2005/0226659 A1 | 10/2005 | Ebe | |

(Continued)

FOREIGN PATENT DOCUMENTS

| | | |
|---|---|---|
| CN | 1243523 A | 2/2000 |
| CN | 1258027 A | 6/2000 |

(Continued)

*Primary Examiner* — Thao T Tran
(74) *Attorney, Agent, or Firm* — Dierker & Kavanaugh, P.C.

(57) ABSTRACT

A method of preparing the surface of a roller comprising adding a coating comprising isocyanate to a ground surface of the roller. A roller comprising a ground surface, the ground surface having unreacted hydroxyl (—OH) groups on the surface of the roller and a layer of isocyanate layered over the unreacted hydroxyl (—OH) groups on the surface of the roller, the isocyanate forming a urethane bond on the surface of the roller.

16 Claims, 8 Drawing Sheets

(56) References Cited

U.S. PATENT DOCUMENTS

| | | | |
|---|---|---|---|
| 2006/0018686 A1* | 1/2006 | Sano | G03G 15/0818 399/286 |
| 2007/0111874 A1* | 5/2007 | Sugimura | G03G 15/0818 492/59 |
| 2007/0149377 A1* | 6/2007 | Motokawa | G03G 15/0233 492/28 |
| 2007/0201909 A1* | 8/2007 | Goto | G03G 15/0812 399/284 |
| 2007/0217823 A1* | 9/2007 | Kuroda et al. | 399/174 |
| 2008/0069600 A1* | 3/2008 | Nakamura et al. | 399/286 |
| 2008/0070147 A1 | 3/2008 | Uchino et al. | |
| 2008/0219713 A1* | 9/2008 | Gopalanarayanan | B05D 5/12 399/286 |
| 2008/0220361 A1 | 9/2008 | Uchino et al. | |
| 2008/0286016 A1* | 11/2008 | Kawamura et al. | 399/286 |
| 2009/0311012 A1* | 12/2009 | Mabuchi et al. | 399/286 |
| 2010/0080611 A1 | 4/2010 | Kurachi et al. | |
| 2010/0158564 A1 | 6/2010 | Nakamura | |
| 2010/0222193 A1 | 9/2010 | Motokawa | |
| 2010/0261002 A1 | 10/2010 | Tajima et al. | |

FOREIGN PATENT DOCUMENTS

| | | |
|---|---|---|
| CN | 1963685 A | 5/2007 |
| CN | 101835604 A | 9/2010 |
| JP | 06-301278 | 10/1994 |
| JP | 2007232861 A | 9/2007 |

\* cited by examiner

ROLLER COATING

BACKGROUND

One component of a liquid electrophotographic printing system is a developer roller. The developer roller is responsible for forming a uniform layer of ink as well as transporting an amount of ink onto a separate photoconductive surface. An ink layer is developed on developer roller surface through a high electric field. The photoconductive surface is typically on a cylinder often called a photo imaging plate (PIP). The photoconductive surface is selectively charged with a latent electrostatic image with image and background areas having different electrical potentials. Once the ink has been transferred to the separate surface, it may then eventually be transferred to a sheet of paper or other media thereby producing an image. For most transfer processes in an electrophotographic printing system, an electrical field is applied to electrically charged ink. The ink is charged such that it will be attracted to the photo imaging plate (PIP). The developer roller is made of a material capable of transferring this ink while also cooperating with other rollers within the electrophotographic printing system to achieve that goal. The material used for the developer roller establishes the quality of an image produced by the liquid electrophotographic printing system.

Developer rollers generally have a certain level of hardness, electrical conductivity, chemical stability, surface chemistry and morphology, and mechanical stability to interact appropriately with the rest of the components of the system. This is done so that the ink may be transferred to the photo imaging plate effectively and uniformly. However, attempting to fulfill all of the above mentioned criteria simultaneously may prove difficult and a manufacturer may have to settle on specific materials which may be more beneficial in one respect but not another.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

As used herein and in the appended claims, the term "siloxane" is meant to be broadly understood as any chemical compound composed of units of the form $R_2SiO$, where "R" is a hydrogen atom or a hydrocarbon group. For example, a siloxane may be a silicone having a general chemical formula of $[R_2SiO]_n$.

Additionally, as used herein and in the appended claims, the term "isocyanate" is meant to be broadly understood as a functional group of atoms composed of units of the form —N=C=O (1 nitrogen, 1 carbon, 1 oxygen).

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

Figure 1:
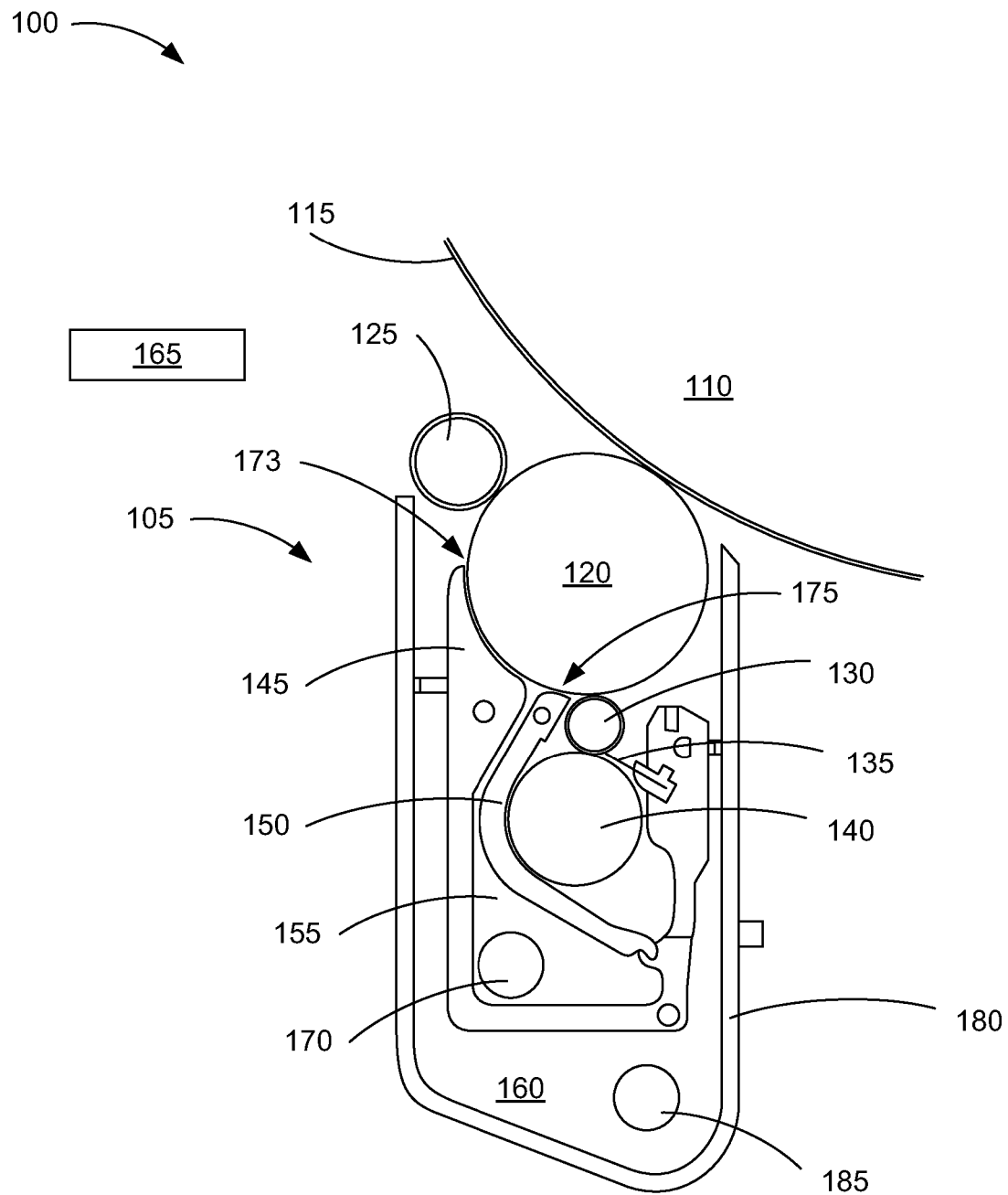
FIG. 1 is a cross-sectional diagram of a binary image development unit according to one example of the principles described herein.

FIG. 1 is a cross-sectional diagram of a binary image development unit (105), according to one example of principles described herein. The binary image development unit (105) comprises a developer roller (120) as well as a number of other static parts and rollers which cooperate to transport an amount of ink from the binary image development unit (105) to the photo imaging plate (115) on the photo imaging drum (110). A binary image development unit (105) as shown in FIG. 1 may be included within a liquid electrophotographic printing system (100). The liquid electrophotographic printing system (100) may include any number of binary image development units (105) as needed, each unit (105) containing a different color or type of ink with which to apply to the photo imaging plate (115). An example of such a system (100) can be found within some of the INDIGO® digital presses manufactured by Hewlett-Packard Company. Additionally, an example of an ink that may be used within the binary image development unit (15) may be an ink containing charged pigmented particles in a liquid carrier developed and manufactured by Hewlett-Packard Company under the trademark Electroink®.

The binary image development unit (105) includes a back electrode (150), a main electrode (145), a developer roller (120), a squeegee roller (125), a cleaner roller (130), a wiper blade (135), a sponge roller (140), an ink chamber (155), an ink reservoir (160), an ink inlet (170), and an ink outlet (185). The liquid electrophotographic printing system (100) therefore includes the binary image development unit (105) mentioned above as well as a photo imaging plate (115) coupled to a photo imaging drum (110) and an imager (165). Each of these will now be discussed in more detail.

As discussed previously, the binary image development unit (105) selectively coats the photo imaging plate (115) with an amount of ink. To accomplish this, separate ink tanks are used to hold and control the desired properties of the ink such the ink's density and conductivity. One ink tank may be used for each color. At idle stage, for example, before printing starts, the binary image development unit (105) is empty and does not contain ink. To start developing ink, the binary image development unit (105) is provided with a flow of ink pumped from ink tanks through the ink inlet (170) that allows a continuous supply of ink at the development area, i.e., the gaps (173, 175) between developer roller (120) and electrodes (150, 145). As mentioned earlier, the ink may be positively or negatively charged. For purposes of simplicity in illustration, the ink within the binary image development unit (105) in FIG. 1 is negatively charged. Still further the ink may contain varying amounts of solids within the ink solution. In one example, the ink may be comprised of 2-3% solids.

As the ink is pumped into the ink chamber (155) via the ink inlet (170), two electrodes, a main electrode (145) and a back electrode (150), apply an electric field across two gaps (173, 175). A first gap (173) is located between the main electrode (145) and the developer roller (120), and a second gap (175) is located between the back electrode (150) and the developer roller (120). The electric charge across these gaps (173, 175) causes the ink particles to be attracted to the more positively charged developer roller (120). The developer roller (120) may be made of a polyurethane material with an amount of ionic salt mixed into the material. This gives the developer roller (120) the ability to hold a specific charge having a higher or lower negative charge compared to the other rollers (125, 110, 130) that the developer roller (120) directly interacts with.

In one example, the electrical bias between the electrodes (145, 150) and the developer roller (120) produces an electric field between the electrodes (145, 150) and the developer roller that is about 800-1000 volts. With a gap (173, 175) of about 400-500 μm, the electric field becomes relatively high and the negatively charged ink particles are attracted to the developer roller (120). This creates a layer of ink over the developer roller (120).

As the ink particles are built up on the developer roller (120), a squeegee roller (125) is used to squeeze the top layer of oil away from the ink. The squeegee roller (125) also develops some of the ink onto the developer roller (120). In order to accomplish these two objectives, the squeegee roller (125) is both more negatively charged relative to the developer roller (120) and abuts the developer roller (120) creating a nip. As the squeegee roller (125) comes in contact with the developer roller (120), the ink layer on the developer roller (120) is now more concentrated. In one example, the squeegee roller (125) may develop the ink layer and remove enough oil from the ink such that the particle concentration is increased. In one example, the resulting ink concentration may be around 20% to 25% pigment concentration.

After the ink on the developer roller (120) has been further developed and concentrated by the squeegee roller (125), the ink is transferred to the photoconductive photo imaging plate (115). In one example, the photo imaging plate (115) may be coupled to a photo imaging drum (110). In another example, the photo imaging drum (110) may incorporate the photo imaging plate (115) such that the photo imaging drum (110) and photo imaging plate (115) are a single piece of photoconductive material. However, for purposes of simplicity in illustration, the photo imaging plate (115) and photo imaging drum (110) are separate pieces thereby allowing the photo imaging plate to be selectively removed from the photo imaging drum (110) for replacement if needed.

In one example, prior to transfer of ink from the developer roller (120) to the photo imaging plate (115), the photo imaging plate or, alternatively, the photo imaging drum (110) and plate (115), is negatively charged with a charge roller. In another example, the photo imaging plate or, alternatively, the photo imaging drum (110) and plate (115), is negatively charged with a scorotron. A latent image may, therefore, be developed on the photo imaging plate (115) by selectively discharging selected portions of the photo imaging plate (115) with, for example, a laser (165). The discharged area on photo imaging plate (115) is now more positive as compared with developer roller (120), while the charged area of photo imaging plate (115) is still relatively more negative as compared with developer roller (120). When the developer roller (120) comes in contact with the photo imaging plate (120) the negatively charged ink particles are attracted to the discharged areas on the photo imaging plate (115) while being repelled from the still negatively charged portions thereon. This creates an image on the photo imaging plate (115) which will then be transferred to another intermediate drum or directly to a sheet of media such as a piece of paper.

Because a portion of the ink is transferred from the developer roller (120) to the photo imaging plate (115), the excess ink may be removed from the developer roller (120) using a cleaner roller (130). The cleaner roller (130) may have a more positive bias compared to the developer roller (120). As such, the negatively charged ink particles are attracted to the cleaner roller (130) and thereby removed from the developer roller (120). A wiper blade (135) and sponge roller (140) may subsequently remove the ink from the cleaner roller (130).

However, as discussed above, the developer roller (120) does not always transfer the ink appropriately. This is because the developer roller 120) is made of a material that improves on one aspect or parameter of the developer roller (120) while sacrificing or lowering the developer roller's (120) ability to perform another function. For example, the developer roller (120) should be compliant with the other rollers which it interacts with; namely the squeegee roller (125), the cleaner roller (130), and the photo imaging plate (115) and drum (110). These rollers (125, 130) and the photo imaging plate (115) are made of hard materials such as metal. Therefore, the developer roller (120) may be made of a material that has a low hardness value compared to these other rollers (125, 130), the photo imaging plate (115), and the photo imaging drum (110).

Similarly, increasing the length of a developer roller (120) that is made of a material that is too hard may result in the developer roller (120) bending under the excess force created by the squeegee roller (125), the cleaner roller (130), and the photo imaging plate (115) and drum (110). The developer roller (120) is held to the binary image development unit housing (180) by the two ends so that the roller may freely contact the other rollers. If the developer roller (120) were to bend, this would result in the developer roller (120) not having as much contact with the other rollers at or around the center of the developer roller (120) while having too much contact with the other rollers at the ends. This would result in poor ink transfer between the rollers and would produce an inferior printed product. Additionally, parts of the developer roller (120) at the ends may dislodge from the developer roller (120) thereby scattering through the components in the binary image development unit (105) creating mechanical and electrical disturbances.

Also, a developer roller that is made of a material that is too soft may also produce an inferior product. Such a material may more easily succumb to the sheer forces experienced in the liquid electrophotographic printing system thereby causing pieces of the developer roller to be displaced and disrupt other systems in the liquid electrophotographic printing system.

Still further, the developer roller (120) has a certain level of conductivity such that the ink solution may be attracted to it when appropriate. Many factors are taken into account when creating an appropriately conductive developer roller (120). For example, the humidity and temperature of environment in which the developer roller (120) is operating in will affect the conductivity of the developer roller (120). Higher heat and humidity may lead to a more conductive developer roller (120). Therefore, for proper operation, these factors are controlled such that the conductivity of the developer roller (120) will operate properly. Even further, a developer roller (120) that is relatively harder will also be less conductive.

To help make the developer roller (120) more conductive, an amount of ionic salt or carbon black particles may be added to the material with which the developer roller (120) is constructed. However, additional amounts of, for example, ionic salt added to the developer roller will not appropriately overcome any drops in conductivity. Indeed, additional ionic salts added to the material the developer roller (120) is made of may result in the salt leaching out of the roller (120) and cause some system failures. For example if the ionic salt leaches out of the developer roller (120) it may come in contact with the photo imaging plate (115) and cause those portions of surface of the photo imaging plate (115) to become conductive. If this occurs, it becomes difficult to appropriately charge the photo imaging plate (115) such that the latent image will not hold well to the photo imaging plate (115). When this occurs, the resulting image is rendered suboptimal. Therefore, the conductive nature of the polyurethane material of which the developer roller (120) is made of is dictated by a specific chemistry of the polyurethane material. As a result, the polyurethane material is conductive enough to transfer ink to and from the various rollers (110, 120, 125, 130) without the use of excessive amounts of ionic salts mixed into the material. As a result, this will limit the selection of raw materials used to make the developer roller (120).

In addition to the above, the developer roller has a certain level of chemical stability such as when, for example, the developer roller (120) comes in contact with water or oil (hydrocarbons). The ink solution may contain an amount of oil by which the ink particles are transferred, eventually, to a print medium. As discussed above, the squeegee roller (125) helps to eliminate some of this oil from the ink layer formed on the developer roller (120). As a result, the material the developer roller (120) is made of is also chosen such that it is compatible with oil. If the material is not compatible with oil, it may cause the developer roller (120) to swell causing the gaps (173, 175) to be narrowed thereby changing the electrical properties between the electrodes (145, 150) and the developer roller (120).

Still further, the developer roller has a certain level of mechanical stability when interacting with the other rollers (110, 125, 130). As the developer roller (120) comes in contact with the other rollers (110, 125, 130), it creates a nip between the rollers. Therefore, the material of which the developer roller (120) is made of is chosen such that polymer crimping or compression setting will not occur on the developer roller (120) due to the forceful mechanical contact between the metal rollers (110, 125, 130) and the developer roller (120). Polymer crimping or compression setting may result in the developer roller (120) not having a uniform diameter. This may cause the layer of ink developed on the developer roller (120) not to transfer to the photo imaging plate (115) uniformly thereby causing the image developed on the photo imaging plate to be defective (115). Again, this may result in an inferior printed product.

As a result of the above purposes the developer roller (120) fulfills in the binary image development unit (105), the material of which the developer roller can be made of is limited. As discussed above, some formulations may result in the manufacturer choosing a material which fulfills one of these functions relatively well but that fails to appropriately address another purpose. For example, in an attempt to fulfill all the above roles that the developer roller (120) fulfills, the material has a low index (low molecular ratio of NCO/OH) such that not all of the polyol reacts with the isocyanate. In one example, 30% of the polyol is not reacted with the isocyanate. This helps fulfill most of the roles the developer roller (120) plays in the system (100). However, this reduces the mechanical stability of the developer roller (120) and the surface of the developer roller (120) becomes sticky. During developer roller casting process, an amount of mold release agent is needed to be applied on the mold wall surface to reduce the friction between the sticky roller and the mold for successful pulling the rollers out of its mold. Mold release agent, which are often silicone based materials, may stay on developer roller surface to change the surface chemistry features, in which it normally reduces the surface energy. If the mold release on developer roller surface is not uniform, print quality defects may be seen as this will cause non-uniform ink transfer from developer roller to photo image plate. The addition of this mold release agent may also cause distortions in the diameter of the developer roller (120) along its longitudinal axis. This is further exasperated when the developer roller (120) is to be manufactured with a longer length and the deviations in the diameter cannot be more than a few microns difference. It becomes further difficult to increase the length of the developer roller (120) while still maintaining a tight control of mold dimensions (such as diameter run out and surface roughness) of the mold itself. One way to overcome this is to cast a developer roller in a mold having a relatively larger inner diameter. This allows the exterior surface of the developer roller (120) to be ground down to the desired diameter and with a relatively narrow diameter variance along the length of the developer roller (120). However, the grinding process produces a rough and high surface energy surface which, when used in the binary image development unit (105), will again result in a relatively poorer quality printed product. A ground developer roller (120) may also cause ghost or background images to appear in the final printed product.

So as to achieve a relatively better print quality in the finished product, the surface roughness of the developer roller (120) may be controlled during the grinding process. In this disclosure, surface roughness is defined as the average roughness (Ra) across an area of 1 mm wide and 5 mm long and the roughness may be measured by an optical profilometer. In one example, the developer roller (120) of the present application may have a Ra value of less than 0.4 μm.

Figure 2:
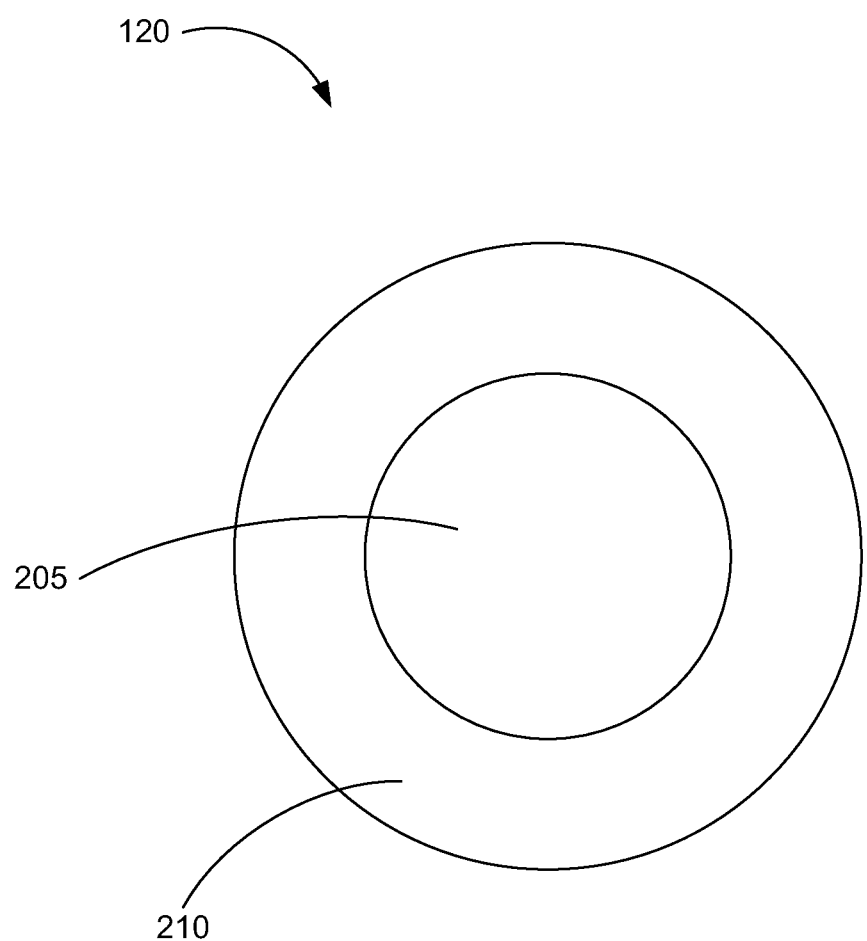
FIG. 2 is a cross-sectional diagram of a developer roller according to one example of the principles described herein.

Turning now to FIG. 2, a cross sectional view of a developer roller (120) is shown according to one example of the principles described herein. The developer roller (120) may consist of an inner core (205) and an outer layer (210). The inner core (205) is made of a metal that is generally rigid enough to support the outer layer (210) as well as interact with other rollers within the binary imaging development unit (105). Additionally, the metal that the inner core (205)

is made of is conductive such that it may allow a charge to transfer from the inner core (205) and into the outer layer (210).

The outer layer (210) may be made of any type of resilient materials including, for example, natural rubber, synthetic rubber, polyurethane, and epichlorohydrin (1-chloro-2,3-epoxypropane). Additional chemicals may be added to the material forming the outer layer (210) so that the charge from the inner core (205) may be applied to the outer layer (210) and so that the outer layer (210) may retain that electrical charge. These additional chemicals may include, for example, an ionic salt or carbon black particles.

The outer layer (210) of the developer roller (120) may be formed via an "as cast" method by placing the inner core (205) into a mold and pouring an amount of outer layer (210) material around the core. The material is then cured and the completed developer roller (120) is removed from the mold. However, as briefly mentioned, the diameter of the developer roller (120), after being taken out of its mold, may have some variation. This variation in the final diameter of the developer roller (120) may be de minimis, for shorter developer rollers (120). However, as the length of the developer roller (120) increases, the deviation may be above a predetermined and acceptable threshold. To alleviate this, the developer roller (120) may be further processed by grinding down the outer layer (210) of the developer roller (120) to a desired diameter or circumference.

Figure 3:
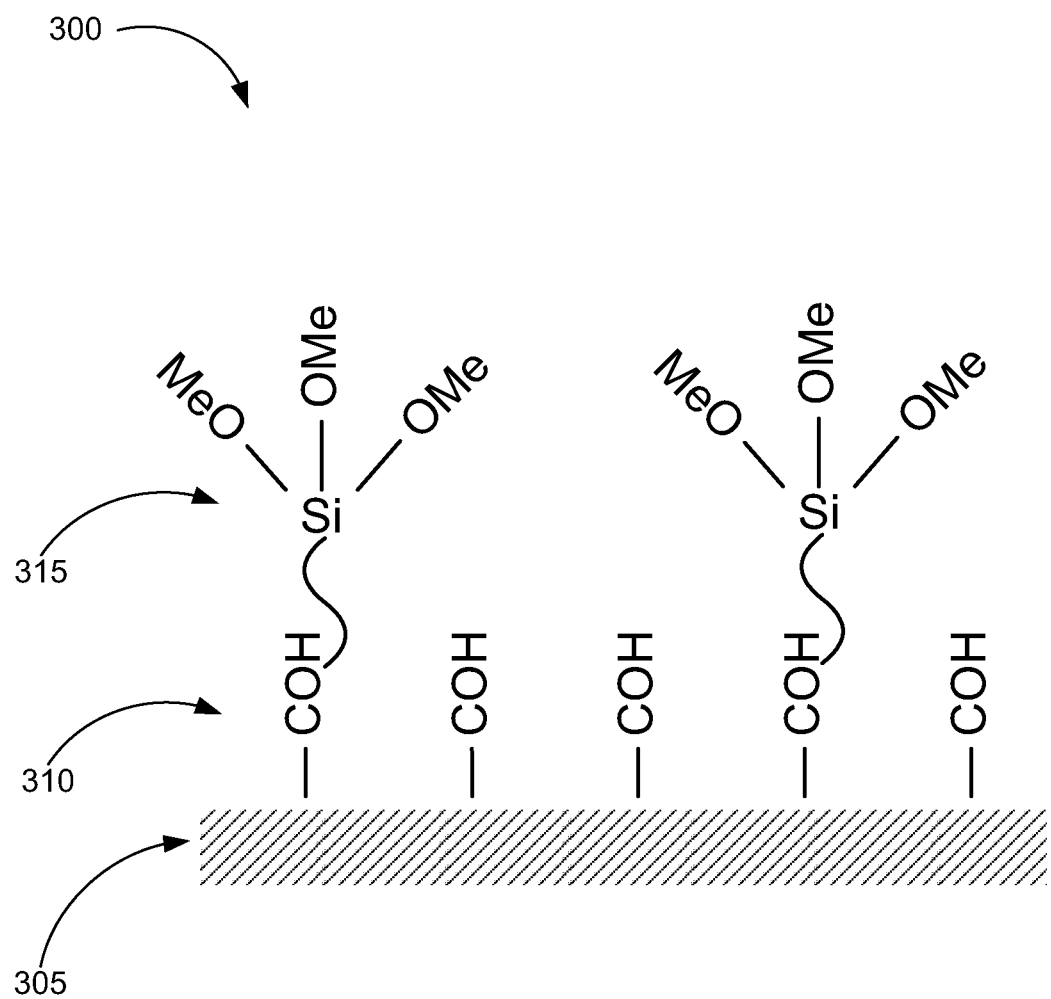
FIG. 3 is a diagram depicting a coating for a ground developer roller according to one example of the principles described herein.

Turning now to FIG. 3, a diagram depicting a coating (200) for a ground developer roller (FIG. 1, 120) is shown according to one example of principles described herein. The coating is directly applied to the surface (305) of the ground developer roller (FIG. 1, 120) by, for example, spray coating, gravure coating, reverse roll coating, gap coating, slot die coating, immersion coating, curtain coating, air knife coating, or combinations thereof. As discussed previously in connection with FIG. 1 above, the surface (305) of the ground developer roller (FIG. 1, 120) contains an amount of unreacted polyol (310) that was not reacted completely with the isocyanate when forming the developer roller. Although throughout the present specification, a specific type of isocyanate produced by a specific company or entity, varying types of isocyanates or isocyanate compounds may be used.

A layer of siloxane material (315) is then coated onto the surface (305) of the developer roller (FIG. 1, 120). In one example, the layer of siloxane material (315) is an isocyanate functional siloxane material such that the siloxane material can be chemically bonded to the surface of the developer roller (FIG. 1, 120) through urethane bonding with surface hydroxyl functional groups. An ionic salt may also be added to the coating mixture as a way to make the surface of the developer roller (FIG. 1, 120) conductive.

Polydimethylsiloxane is one of the siloxanes that can be used for this application. One example of the siloxane material (315) that can be used is the silicone DP-200 manufactured by Stoner Inc. under the name NIX STIX® DP-200. As mentioned above, this DP-200 may be pushed onto the surface of the roller, thereby providing a smooth layer over the surface of the developer roller (120). This allows a layer of ink to form on the developer roller (120) and, as a consequence, allows the developer roller (120) to apply the ink to the surface of the photo imaging plate (115).

In another example, ethyl acetate may be used as a solvent to dilute the above formulations for better processability. Other types of solvents may also be used as well, such as, xylene (isomers of dimethylbenzene), a ketone, or various types of oils. The amount of solvent added to the formulation may vary from 0% to 99% and may be dependant on the thickness of the formulation as well as processing requirements.

Figure 4:
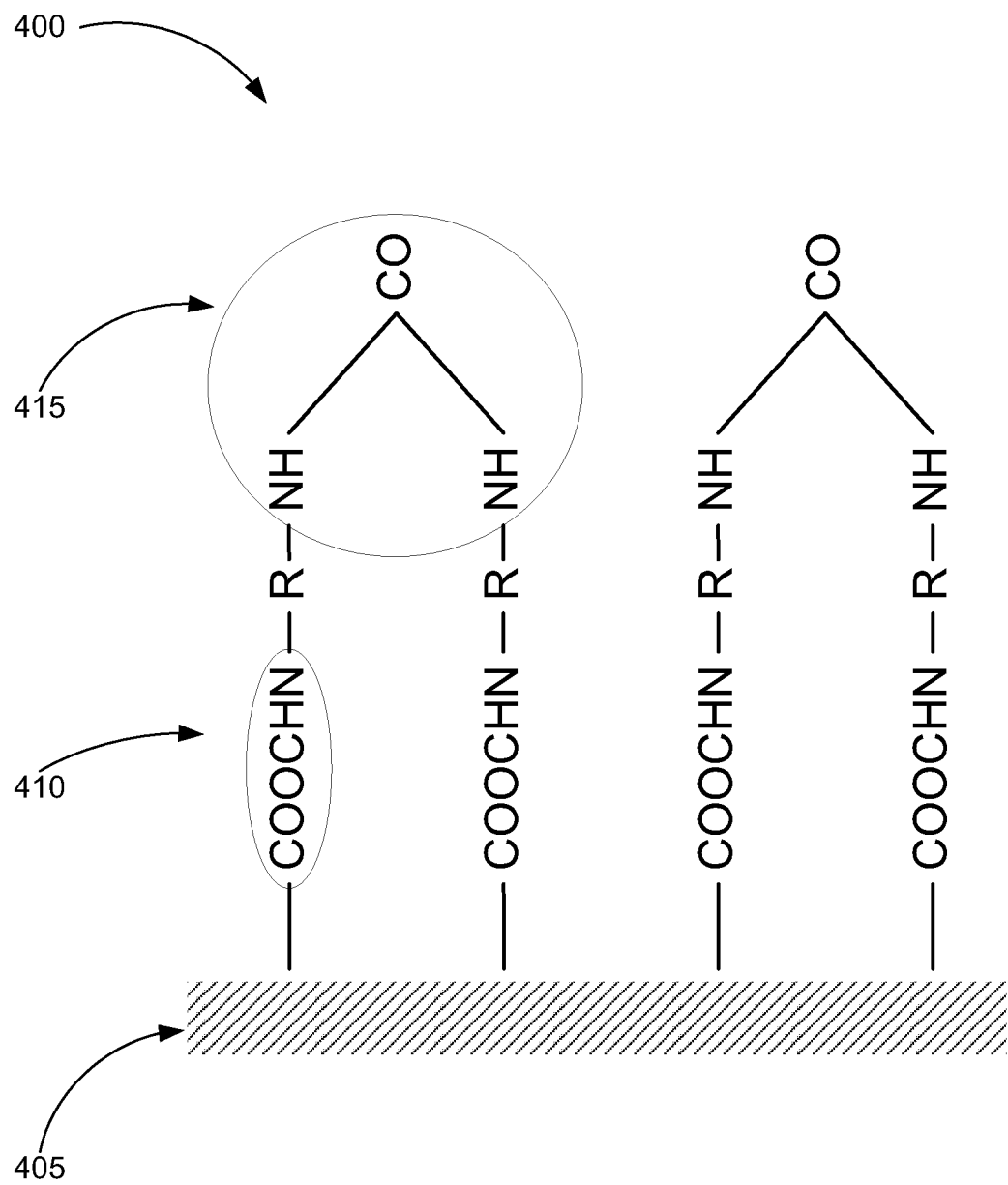
FIG. 4 is a diagram depicting another coating for a ground developer roller according to one example of the principles described herein.

FIG. 4 is a diagram depicting another coating (400) for a ground developer roller (FIG. 1, 120) according to one example of the principles described herein. Again, the chemicals that form the coating may be directly applied to the surface (405) of the ground developer roller (FIG. 1, 120) by, for example, spray coating, gravure coating, reverse roll coating, gap coating, slot die coating, immersion coating, curtain coating, air knife coating, or combinations thereof.

In one example, the coating (400) of FIG. 4 is created by applying a layer of isocyanate to the surface (405) of a ground developer roller (FIG. 1, 120). In another example, the coating of FIG. 4 is created by applying a mixture of isocyanate and organic amines to the surface (405) of the ground developer roller (FIG. 1, 120). The isocyanate will react chemically with the unreacted hydroxyl (—OH) groups from the polyol layer present on the developer roller's (FIG. 1, 120) surface. This will form a urethane bond (410). Any excessive isocyanate is allowed to react with moisture or the amine to form a polyurea layer having a urea bond (415). This develops a urethane (410) bonded polyurea layer on the surface of the developer roller (FIG. 1, 120). An ionic salt may also be added to the coating mixture as a way to make the surface of the developer roller (FIG. 1, 120) conductive.

The polyurea layer (410, 415) provides a relatively more robust surface area resistant to mechanical strains or sheer forces placed on the developer roller (FIG. 1, 120). Additionally, the polyurea layer (410, 415) provides for a relatively higher ink release property than would a ground developer roller (FIG. 1, 120) would provide.

In one example, the layer of isocyanate may comprise aromatic isocyanates manufactured by BAYER® under the name of MONDUR®. In one example, the isocyanate may be a polymeric diphenylmethane diisocyanate such as MONDUR® 541, MONDUR® 541-light, MONDUR® MR, or MONDUR® MR-LIGHT all manufactured by BAYER®. Additionally, ethyl acetate may be used as a solvent to dilute the above formulations for better processability. Other types of solvents may also be used as well, such as, xylene (isomers of dimethylbenzene), a ketone, or various types of oils. The amount of solvent added to the formulation may vary from 0% to 99% and may be dependant on the thickness of the formulation as well as processing requirements.

In yet another example, a catalyst may be added to the layer of isocyanate to allow the reaction between the unreacted hydroxyl groups (—OH) from the polyol layer and the isocyanate to occur relatively quicker. Some examples of catalyst that may be used may include, for example, solution of 33% triethylenediamine and 67% dipropylene glycol such as DABCO® 33-LV manufactured by AIR PRODUCTS AND CHEMICALS, INC., or a tin-based catalysts such as dibutyl tin dilaurate (DBTL).

Figure 5A:
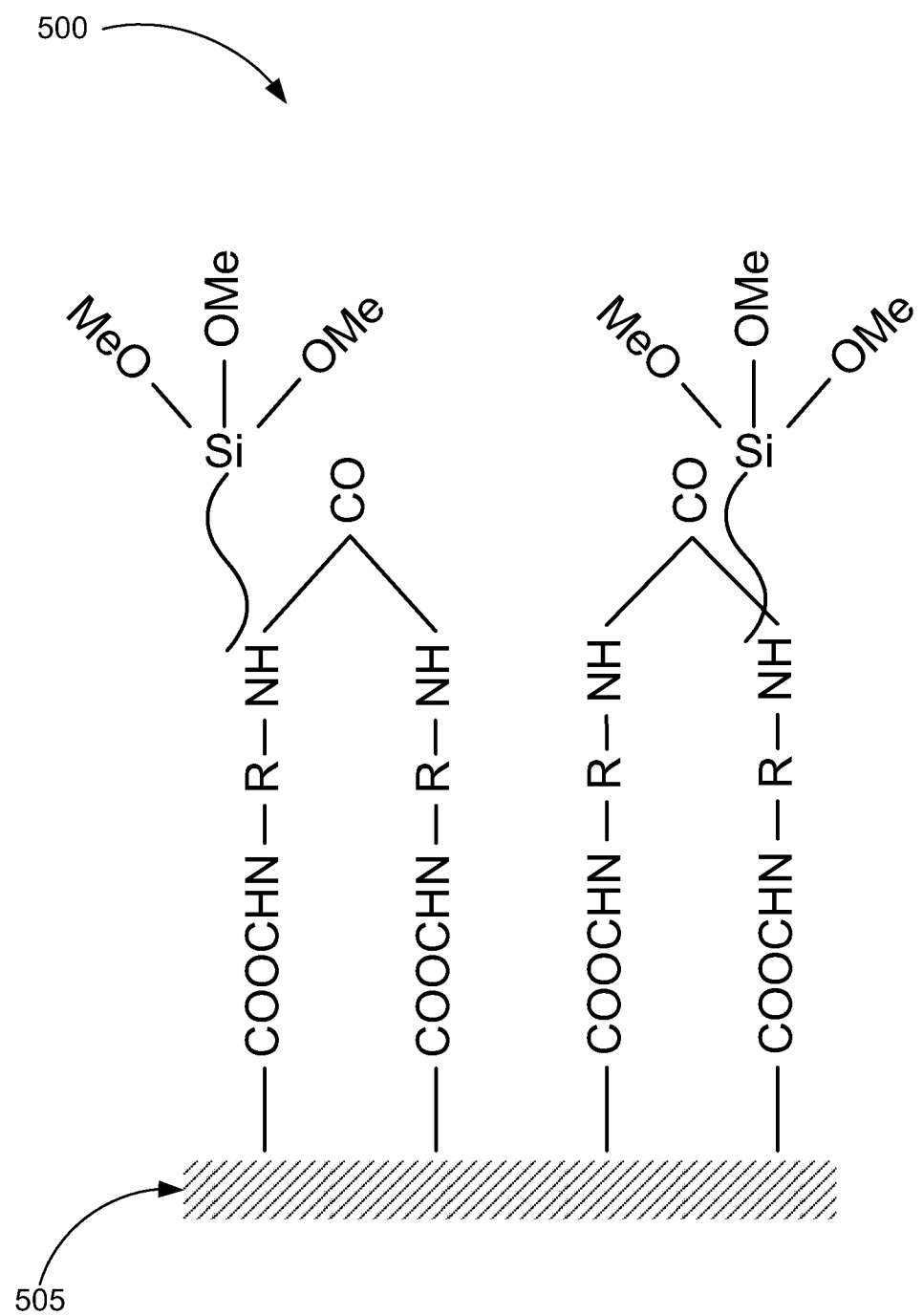
FIG. 5A is a diagram depicting a coating for a ground developer roller comprising isocyanate and a non-functional silicone according to one example of principles described herein.
Figure 5B:
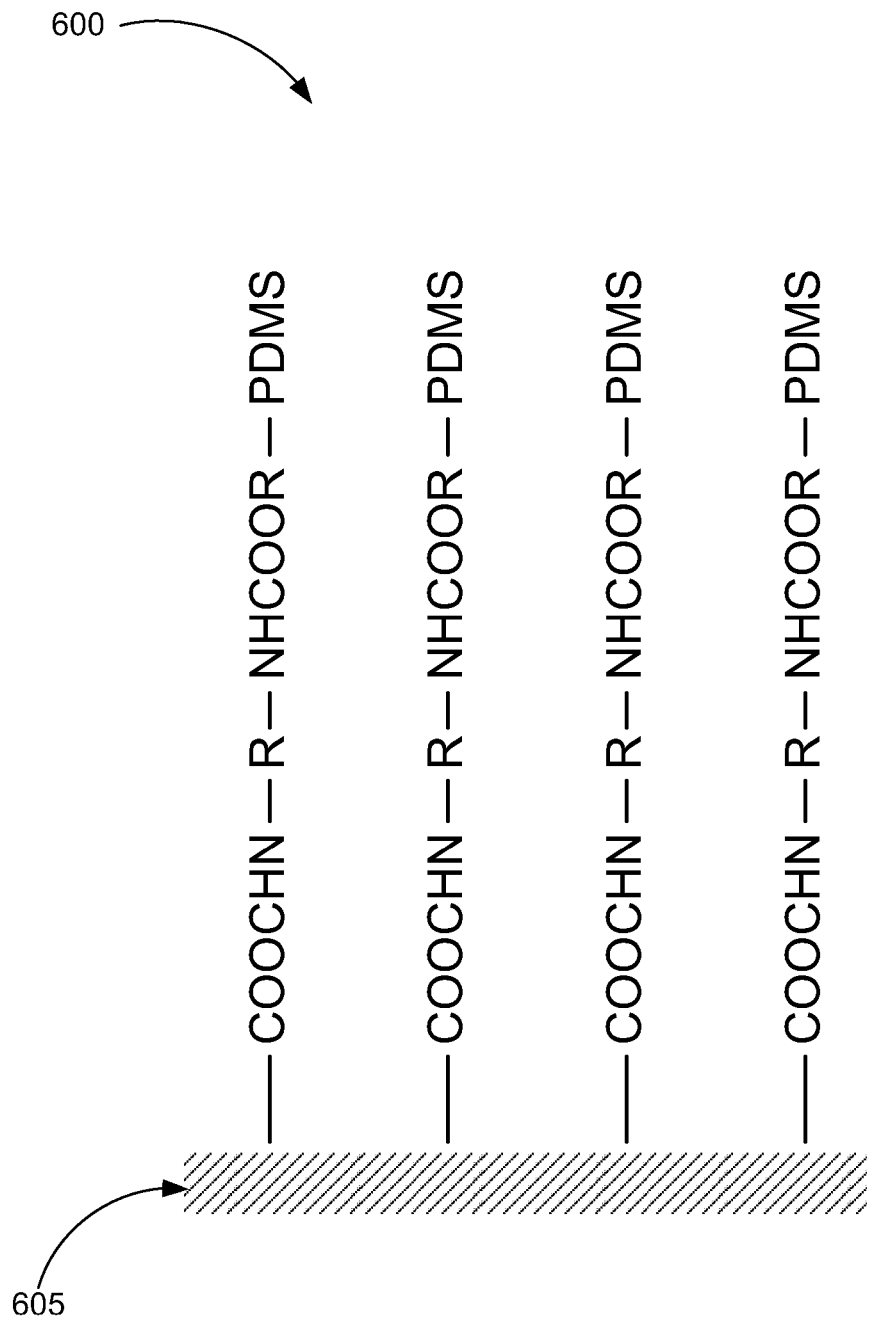
FIG. 5B is a diagram depicting a coating for a ground developer roller comprising isocyanate and a hydroxyl functional silicone according to one example of principles described herein.

FIG. 5A is a diagram depicting a coating (500) for a ground developer roller (FIG. 1, 120) comprising isocyanate and a non-functional silicone according to one example of principles described herein. Additionally, FIG. 5B is a diagram depicting a coating (600) for a ground developer roller (FIG. 1, 120) comprising isocyanate and a functional silicone (—OH ended silicone) according to one example of principles described herein. The various chemical components of these coating are directly applied to the surface (505, 605) of the ground developer roller (FIG. 1, 120) by, for example, spray coating, gravure coating, reverse roll coating, gap coating, slot die coating, immersion coating, curtain coating, air knife coating, or combinations thereof. In the example shown in FIG. 5A, the coating may consist of isocyanate and a non-functional siloxane. In the example shown in FIG. 5B, the coating may consist of a mixture of isocyanate and a hydroxyl functional siloxane.

When the isocyanate and siloxane mixture are added to the surface of the developer roller (120), a polyurethane bond is created between the isocyanate and hydroxyl groups on the developer roller (FIG. 1, 120) surface. Additionally, any excessive isocyanate may be cured by moisture to form polyurea. This provides for a very strong material with a good ink release property having a chemical bonding on the surface of the developer roller (FIG. 1, 120).

Where a non-functional siloxane is used, such as polydimethylsiloxane (PDMS) (($C_2H_6OSi)_n$), the coating provides a chemical bond to the base poylurethane and creates a protective layer on the developer roller (FIG. 1, 120). Additionally, the polymerization process may mechanically encapsulate part of the long chains of silicones in the polymer matrix such that a relatively stronger bonding of silicone is formed on the coating surface.

Where a functional silicone is used having, for example, a hydroxyl or amino ended silicone, additional benefits may be realized apart from those obtained when a non-functional siloxane is used. One benefit is that the silicone materials are chemically bonded in the coating through either urethane (for —OH ended silicone) or urea (for amino ended silicone) bonding. Additionally, using a functional silicone has the added benefit of allowing cross-linking through the selection of multi-functional silicone materials. An ionic salt may also be added to the coating mixture as a way to make the coating more conductive. Additionally, a catalyst may be added to provide for a faster curing process and a relatively better coverage of the surface of the developer roller (FIG. 1, 120). The addition of a catalyst also makes the developer roller (FIG. 1, 120) more manufacturable.

The —OH ended silicone may be, for example carbinol (hydroxyl) terminated polydimethylsiloxane manufactured by GELEST®, INC. such as bicarbinol terminated polydimethylsiloxane manufactured under the name of DMS-C16, DMS-C21, DBE-C25, or DBP-C22, and monocarbinol terminated polydimethylsiloxane MCR-C13, MCR-C18 and MCR-C22. Additionally, some examples of amino functional silicone may be, for example, amonopropyl terminated polydimethylsiloxane 100-120 cST manufactured by GELEST®, INC. under the name DMS-A21 and aminopropyl terminated polydimethylsiloxane, 10-15 cST manufactured by GELEST®, INC. under the name DMS-A11.

In one example, the coating (500) in FIG. 5A may comprise a mixture of polymeric diphenylmethane diisocyanate such as MONDUR® MR-LITE by BAYER® and a non-functional silicon silicone called DP-200 manufactured by Stoner Inc. under the name NIX STIX® DP-200.

In one example, the coating (600) of FIG. 5B may comprise a mixture of polymeric diphenylmethane diisocyanate such as MONDUR® MR-LITE by BAYER® and an —OH bi-functional polydimethylsiloxane (PDMS) such as a carbinol (hydroxyl) terminated polydimethylsiloxane manufactured by GELEST®, INC. under the name DMS-C21.

A catalyst may be added to the layer of isocyanate to allow the reaction between the unreacted hydroxyl groups (—OH) from the polyol layer and the isocyanate to occur relatively quicker. Some examples of catalyst that may be used may include, for example, a solution of 33% triethylenediamine and 67% dipropylene glycol such as found in DABCO® 33-LV manufactured by AIR PRODUCTS AND CHEMICALS, INC.® or a tin-based catalysts such as dibutyl tin dilaurate (DBTL).

Still further, a salt may be added to the coating (600) as describe above to give the developer roller (FIG. 1, 120) the ability to hold a specific charge. In one example, the salt may be a lithium salt such as lithium (bis)Trifluoromethanesulfonimide an example of which is HQ-115 FLUORAD® manufactured by 3M®.

The coating (600) shown in FIG. 5B may contain various amounts of the isocyanate, —OH bi-functional polydimethylsiloxane (PDMS), catalyst, and salt. In one example, the coating (600) may comprise about 5% by weight of polymeric diphenylmethane diisocyanate such as MONDUR® MR-LITE by BAYER® relative to the entire mass of the coating (600). Additionally, this formulation may contain about 1% by weight of an —OH bi-functional polydimethylsiloxane (PDMS) such as a carbinol (hydroxyl) terminated polydimethylsiloxane manufactured by GELEST®, INC. under the name DMS-C21 relative to the entire mass of the coating (600). Still further, ethyl acetate may be added as a solvent to dilute the above formulations for better processability.

In another example, the coating (600) may comprise about 5% by weight of polymeric diphenylmethane diisocyanate such as MONDUR® MR-LITE by BAYER® relative to the entire mass of the coating (600). Additionally, this formulation may contain about 1% by weight of an —OH bi-functional polydimethylsiloxane (PDMS) such as a carbinol (hydroxyl) terminated polydimethylsiloxane manufactured by GELEST®, INC. under the name DMS-C21 relative to the entire mass of the coating (600). Also, about 0.1% by weight of a solution of 33% triethylenediamine and 67% dipropylene glycol DABCO® 33-LV manufactured by AIR PRODUCTS AND CHEMICALS, INC.® may be added relative to the entire mass of the coating (600). Still further, ethyl acetate may be added as a solvent to dilute the above formulations for better processability.

In yet another example, the coating (600) may comprise about 4% by weight of polymeric diphenylmethane diisocyanate such as MONDUR® MR-LITE by BAYER® relative to the entire mass of the coating (600). Additionally, this formulation may contain about 2% by weight of an —OH bi-functional polydimethylsiloxane (PDMS) such as a carbinol (hydroxyl) terminated polydimethylsiloxane manufactured by GELEST®, INC. under the name DMS-C21 relative to the entire mass of the coating (600). Also, about 0.1% by weight of a solution of 33% triethylenediamine and 67% dipropylene glycol DABCO® 33-LV manufactured by AIR PRODUCTS AND CHEMICALS, INC.® added relative to the entire mass of the coating (600). Still further, ethyl acetate may be added as a solvent to dilute the above formulations for better processability.

In another example, the coating (600) may comprise about 3% by weight of diphenylmethane diisocyanate such as MONDUR® MR-LITE by BAYER® relative to the entire mass of the coating (600). Additionally, this formulation may contain about 3% by weight of an —OH bi-functional polydimethylsiloxane (PDMS) such as a carbinol (hydroxyl) terminated polydimethylsiloxane manufactured by GELEST®, INC. under the name DMS-C21 relative to the entire mass of the coating (600). Also, about 0.1% by weight of a solution of 33% triethylenediamine and 67% dipropylene glycol DABCO® 33-LV manufactured by AIR PRODUCTS AND CHEMICALS, INC.® may be added relative to the entire mass of the coating (600). Still further, ethyl acetate may be added as a solvent to dilute the above formulations for better processability.

In yet another example, the coating (600) may comprise about 5% by weight of polymeric diphenylmethane diisocyanate such as MONDUR® MR-LITE by BAYER® relative to the entire mass of the coating (600). Additionally, this formulation may contain about 1% by weight of an —OH bi-functional polydimethylsiloxane (PDMS) such as a carbinol (hydroxyl) terminated polydimethylsiloxane manufactured by GELEST®, INC. under the name DMS-C21 relative to the entire mass of the coating (600). Also, about 0.1% by weight of a solution of 33% triethylenediamine and 67% dipropylene glycol DABCO® 33-LV manufactured by AIR PRODUCTS AND CHEMICALS, INC.® may be added relative to the entire mass of the coating (600). Even further, about 0.04% by weight of a lithium salt such as lithium (bis)Trifluoromethanesulfonimide an example of which is HQ-115 FLUORAD® manufactured by 3M® may be added relative to the entire mass of the coating (600). Still further, ethyl acetate may be added as a solvent to dilute the above formulations for better processability.

Figure 6:
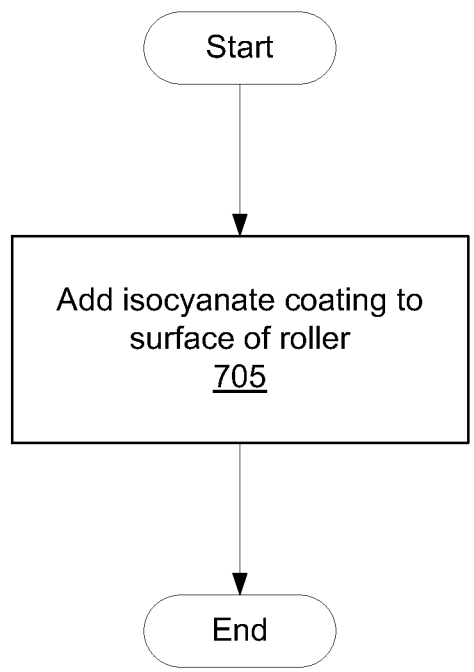
FIG. 6 is a flowchart depicting a method of coating a developer roller according to one example of principles described herein.

Turning now to FIG. 6, a flowchart depicting a method of coating a developer roller (FIG. 1, 120) is shown according to one example of principles described herein. The process may begin with grinding a developer roller (FIG. 1, 120) to a predetermined diameter. As discussed above, the casted diameter of the roller (FIG. 1, 120) may be larger than needed for implementation in the binary imaging device (FIG. 1, 105) and subsequently ground down to the appropriate size. Grinding of the developer roller (FIG. 1, 120), within the meaning of the claims, may be performed by any of a number of different methods. The grinding process may result in a developer roller (FIG. 1, 120) having any degree of surface roughness. As mentioned above, in one example, the surface roughness may be less than 0.4 µm. Grinding of the developer roller (FIG. 1, 120) is done so as to both remove any surface coating that may exist from the casting process as well as provide a surface onto which a coating may be deposited.

After grinding, an isocyanate coating may be coated (Block 705) onto the ground developer roller (FIG. 1, 120). As discussed briefly above this will at least allow the isocyanate to react with the unreacted hydroxyl (—OH) groups on the developer roller (FIG. 1, 120) forming a urethane bond.

Figure 7:
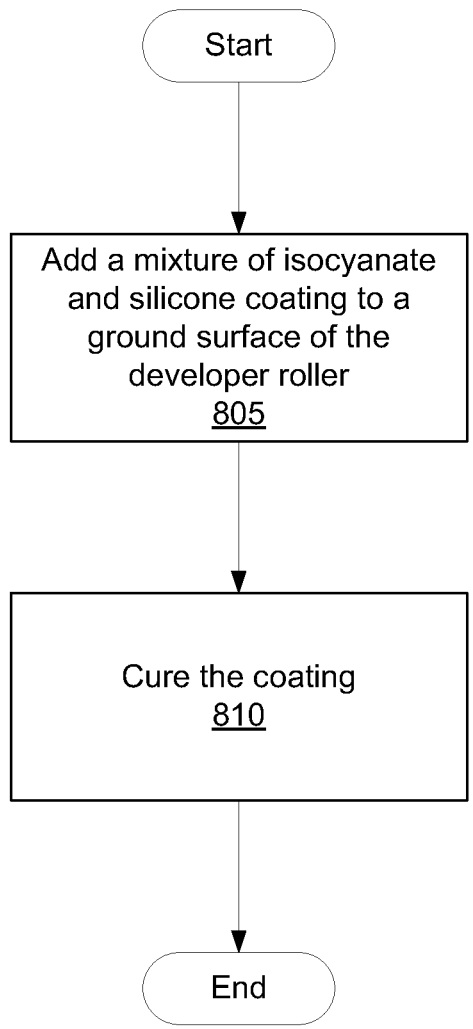
FIG. 7 is a flowchart depicting a method of coating a developer roller according to another example of principles described herein.

FIG. 7 is a flowchart depicting a method of coating a developer roller (FIG. 1, 120) according to another example of principles described herein. Again, the process may begin with grinding a developer roller (FIG. 1, 120) to a predetermined diameter. The casted diameter of the roller (FIG. 1, 120) may be larger than is needed for implementation in the binary imaging device (FIG. 1, 105) and subsequently ground down to the appropriate size. This is done so as to, for example, remove any surface coating that may exist from the casting process as well as provide a surface onto which a coating may be deposited.

After the developer roller (FIG. 1, 120) is ground, a mixture of isocyanate and silicone is coated (Block 805) onto the surface of the developer roller (FIG. 1, 120). The silicone may be either an —OH or amino ended functional or non-functional silicone. After the mixture has been coated (Block 805) onto the developer roller, the coating is allowed to cure (810).

The specification and figures describe a method of preparing the surface of a roller. The present method provides a roller that can be cast at longer lengths and comprises a roller made of a material comprising an improved level of hardness, conductivity, chemical stability, and mechanical stability to interact appropriately with the rest of the components of the system. This method of preparing the surface of a roller may have a number of advantages, including a roller surface that is mechanically and chemically resilient and which can be coated onto a developer roller having any predetermined length.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of preparing a surface of a roller, comprising:
grinding the surface of the roller, the surface being made from natural rubber, synthetic rubber, polyurethane, or epichlorohydrin; and
adding a coating comprising isocyanate and non-functional polydimethylsiloxane to the ground surface of the roller, wherein the isocyanate reacts with a polyol in the ground surface to form a chemical bond, wherein all oxygen atoms in the polydimethylsiloxane are each bonded to two silicon atoms, and all silicon atoms in the polydimethylsiloxane are bonded only to oxygen atoms and alkyl groups.

2. The method of claim 1, in which the coating forms a polyurethane bond with the roller.

3. The method of claim 2, in which excess isocyanate within the coating is cured by moisture to form polyurea, the formation of polyurea accelerated by a catalyst.

4. The method of claim 1, in which adding the coating comprising isocyanate to the surface of the roller creates a urethane bond with unreacted hydroxyl (—OH) groups on the surface of the roller.

5. The method of claim 1, in which the coating further comprises a functional silicone.

6. The method of claim 1, further comprising forming the roller by:
placing an inner core into a mold;
pouring an amount of an outer layer material around the core;
curing the material to form the roller having an outer layer; and
removing the roller from the mold;
wherein the outer layer is the surface that is exposed to the grinding.

7. The method of claim 1, wherein the isocyanate comprises polymeric diphenylmethane diisocyanate.

8. The method of claim 1, wherein the isocyanate is mixed with a solvent that is free of hydroxyl groups.

9. The method of claim 1, wherein the grinding of the surface of the roller generates a surface roughness of less than 0.4 µm.

10. The method of claim 1, wherein the surface includes an ionic salt.

11. The method of claim 1, wherein the coating further comprises a lithium salt.

12. The method of claim 11, wherein the lithium salt is lithium (bis)Trifluoromethanesulfonimide.

13. A roller comprising:
a ground surface; the ground surface having unreacted hydroxyl (—OH) groups on the surface of the roller; and
a layer of isocyanate and non-functional polydimethylsiloxane layered over the unreacted hydroxyl (—OH)

groups on the surface of the roller; the isocyanate forming a urethane bond with the hydroxyl groups on the surface of the roller, wherein the unreacted hydroxyl groups on the surface of the roller are provided by polyols, all oxygen atoms in the polydimethylsiloxane are each bonded to two silicon atoms, and all silicon atoms in the polydimethylsiloxane are bonded only to oxygen atoms and alkyl groups.

14. The roller of claim 13, in which the isocyanate reacts with moisture to form a polyurea.

15. The roller of claim 13, in which the isocyanate reacts with an organic amine to form a polyurea.

16. A method of preparing a developer roller, comprising:
grinding a surface of the developer roller;
adding a mixture of isocyanate and silicone coating to the ground surface of the developer roller, wherein the silicone is a non-functional polydimethylsiloxane wherein all oxygen atoms in the polydimethylsiloxane are each bonded to two silicon atoms and all silicon atoms in the polydimethylsiloxane are bonded only to oxygen atoms and alkyl groups; and
curing the coating wherein the mixture of isocyanate and silicone coating forms a urethane bond with the surface of the developer roller.

\* \* \* \* \*